No. 610,494. Patented Sept. 6, 1898.
W. NELSON.
FENCE WIRE TRUCK.
(Application filed Mar. 21, 1898.)
(No Model.)
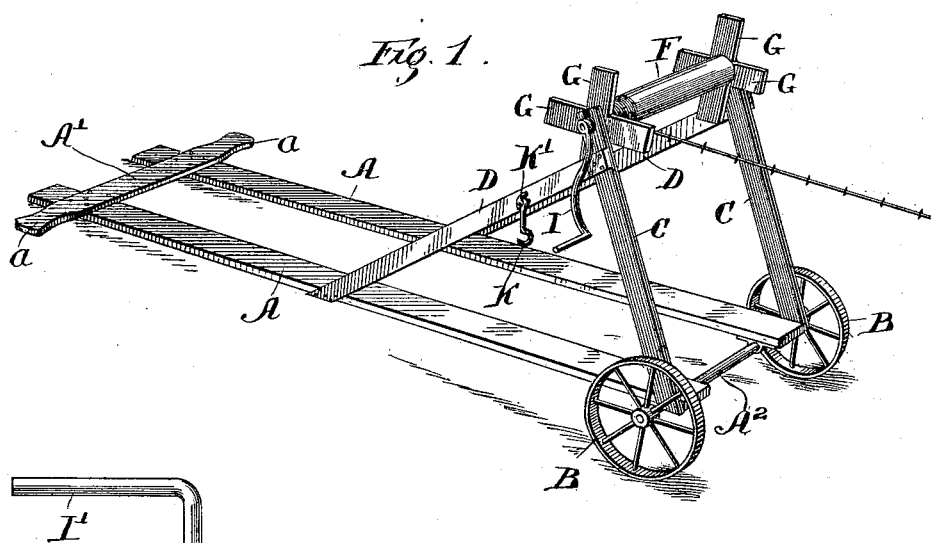
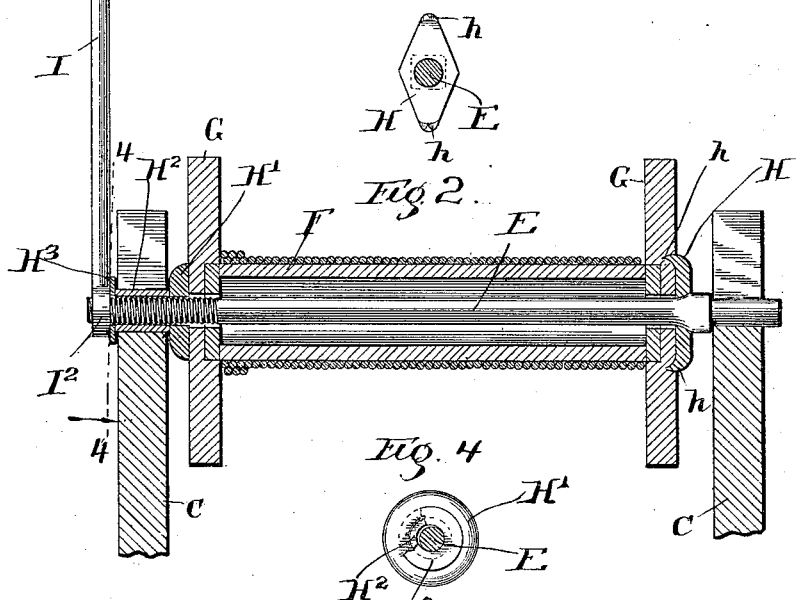
Witnesses:
Chas. O. Shurvey.
A. H. Nelson
Inventor:
William Nelson
by Wilso. Garner & Pitner
Attys.

UNITED STATES PATENT OFFICE.

WILLIAM NELSON, OF WOODFORD, WISCONSIN, ASSIGNOR OF ONE-HALF TO JAMES M. DIVAN, OF MONROE, WISCONSIN.

FENCE-WIRE TRUCK.

SPECIFICATION forming part of Letters Patent No. 610,494, dated September 6, 1898.

Application filed March 21, 1898. Serial No. 674,583. (No model.)

*To all whom it may concern:*

Be it known that I, WILLIAM NELSON, a citizen of the United States of America, residing at Woodford, in the county of Lafayette and State of Wisconsin, have invented certain new and useful Improvements in Fence-Wire Trucks, of which the following is a specification.

My invention relates to improvements in trucks or carts for distributing and taking up barbed wire in building or taking down barbed-wire fences, the objects of the invention being to provide a cheap, simple, and durable cart or truck for that purpose and also to provide a spool-shaft having a crank for its rotation and simple and effective means for connecting it rigidly with a spool for barbed wire, the shaft being adapted to be mounted and supported in the cart or truck.

The invention is fully described and explained in this specification and shown in the accompanying drawings, in which—

Figure 1 is a perspective view of a complete cart supporting a barbed-wire spool with its detachable shaft and crank. Fig. 2 is a longitudinal central section of the spool, showing its connection with the shaft and the position of the shaft in the truck-frame. Fig. 3 is an inner face elevation of a plate which is rigidly mounted on one end of the spool-shaft and provided with spurs on its inner face adapted to engage one of the end bars of the spool; and Fig. 4 is a transverse section of the spool-shaft through the line 4 4, Fig. 2.

In the views, A A are two preferably parallel side bars of the frame or platform of the truck, the bars being preferably connected at one end by a cross-bar A' and at the opposite end by a suitable axle $A^2$, of which the ends are supported by wheels B B, adapted to travel along the ground. On the platform thus described is a raised support, preferably made up of two sets of oblique bars C C D D, the bars C C extending upward and backward from the front end of the platform and the bars D D extending downward and backward from the upper ends of the bars C C to the platform, each set of bars thus forming braces for the other set. The bars C C are slotted or otherwise formed at their upper ends to conveniently receive and support a rotatable spool-shaft E, adapted to be rigidly connected with a barbed-wire spool, as illustrated in Fig. 2. As thus shown, the spool is made up of a hollow axial box F and end bars G G, which cross each other and are fastened together and to the box to form a complete spool. The spool itself forms no part of this invention, and it may have its cross-bars overlapped instead of halved together, as shown in the drawings, and its central hollow box may be made up of flat strips, the purpose of the box being merely to hold the end bars together and form a suitable hollow core on which the barbed wire may be wound. The end bars are bored at their centers to permit the insertion of the shaft E, and the shaft is provided near one of its ends with a plate H, formed on its inner face with spurs *h h*, which are adapted to enter the cross-bar and prevent rotation of the shaft with reference to the spool when the parts are fastened together. The end of the shaft opposite the plate H is screw-threaded for a considerable distance, and the shaft is provided at that end with a plate H', a sleeve $H^2$, and a washer $H^3$, adapted to slip freely over the screw-threaded portion of the shaft, so that the plate H' may be forced into close contact with the corresponding end bar G of the spool.

A crank I, having at its outer end a handle I', is formed at its inner end with a boss $I^2$, screw-threaded to fit the screw-threaded portion of the shaft, and when the shaft is inserted in a spool in the manner shown in Fig. 2 it is evident that the boss $I^2$ may be screwed upon the shaft, so as to force the plate H', sleeve $H^2$, and washer $H^3$ inward to any desired degree, thus insuring the firm contact of the plate H' with the end bar of the spool. The slots in the bars C C of the truck-frame are so formed that the end of the shaft outside the plate H fits approximately in one of them and the sleeve $H^2$ fits in the other, thus forming the shaft-journal at one end and protecting the thread of the screw on the shaft in the operation of the machine. The length of barbed-wire spools varies somewhat, and the screw-threaded portion of the shaft is therefore of considerable length to accommodate the shaft to such variation, and the normal space between the upper ends of the bars C C of the truck-frame is such that in the use of the shortest spool the bars must be sprung slightly apart at their upper ends in order to admit the shaft. In the use of longer spools the bars must be sprung apart still more; but the length of the bars is such that they easily have this range of movement.

In either building or taking down barbed-wire fencing the spool is mounted in the truck, as shown in the drawings and as hereinbefore described. In building fence, the spool filled with wire being thus mounted, the outer end of the wire is loosened from the spool and fastened to a post at one end of a section of fence. A single operator can then lift the cross-bar A' of the truck from the ground and walk along the line of fence, thus unreeling the wire and stretching it, so that it lies in a straight line ready to be stapled to the fence-posts. In taking down fencing, on the other hand, the staples having been drawn from the fence-posts, one end of a strand of wire is fastened to the spool, the other end being fastened to a post, and the wire may then be wound upon the spool by simply rotating the crank, the draft upon the wire being sufficient to draw the truck toward the post to which the wire is fastened. The rear end of the frame resting on the ground forms ordinarily a sufficient drag to give the wire the necessary tension; but this may be increased, if desired, by placing a weight of any kind on the platform. A single operator can thus reel up the wire without touching the frame of the truck. It is hardly necessary to say that the spool of wire in either case may be transported upon the truck from place to place on the farm.

In the operation of building fence I have found it desirable to provide the truck with means for stretching each strand of fence-wire tight enough for stapling to the posts and holding in such strained condition while the staples are driven. In order to do this, two things are necessary—namely, means for connecting the truck-frame with a post, so as to hold it stationary, and means for preventing rotation of the spool-shaft after the wire has been properly tightened by its rotation. The means for fastening the truck-frame to a post may evidently be in almost any form; but a very simple and effective device for the purpose is furnished by merely lengthening the cross-bar A', so as to make it project beyond the side bars A A, forming the lugs or handles $a$ $a$. These projections may be straight-edged, but are preferably formed with curved notches in their front edges, as shown in Fig. 1, the rear edges being correspondingly notched, if desired, for symmetry of appearance. To provide means for preventing accidental rotation of the spool-shaft, it is only necessary to mount on the corresponding brace D a hook K, pivoted in the staple K' and adapted to engage the crank or its handle after the wire has been suitably tightened.

Having now described and explained my invention, what I claim as new, and desire to secure by Letters Patent, is—

1. The combination with a shaft screw-threaded at one end and adapted to be inserted at the axis of a barbed-wire spool, of a plate attached to said shaft near one of its ends and provided with spurs adapted to enter the corresponding end bar of the spool, a plate and sleeve adapted to slip freely over the screw-threaded portion of the shaft and impinge upon the opposite end bar of the spool, and a crank screw-threaded to engage said screw-threaded portion of the shaft and to force said plate and sleeve inward, whereby the shaft may be rigidly connected with the spool, and said sleeve may cover said screw-threaded portion and form the journal at the corresponding end of the shaft.

2. The combination with the spool having the end bars G, G, of the shaft, E, provided with the plate, H, having spurs, $h$, $h$, the plate, H', and sleeve, $H^2$, and the crank, I, screw-threaded to engage the corresponding screw-threaded portion of the shaft; substantially as shown and described.

In witness whereof I have hereunto set my hand, at Woodford, in the county of Lafayette and State of Wisconsin, this 16th day of March, A. D. 1898.

WILLIAM NELSON.

Witnesses:
A. S. DOUGLAS,
P. J. CLEMSON.